Patented June 12, 1928.

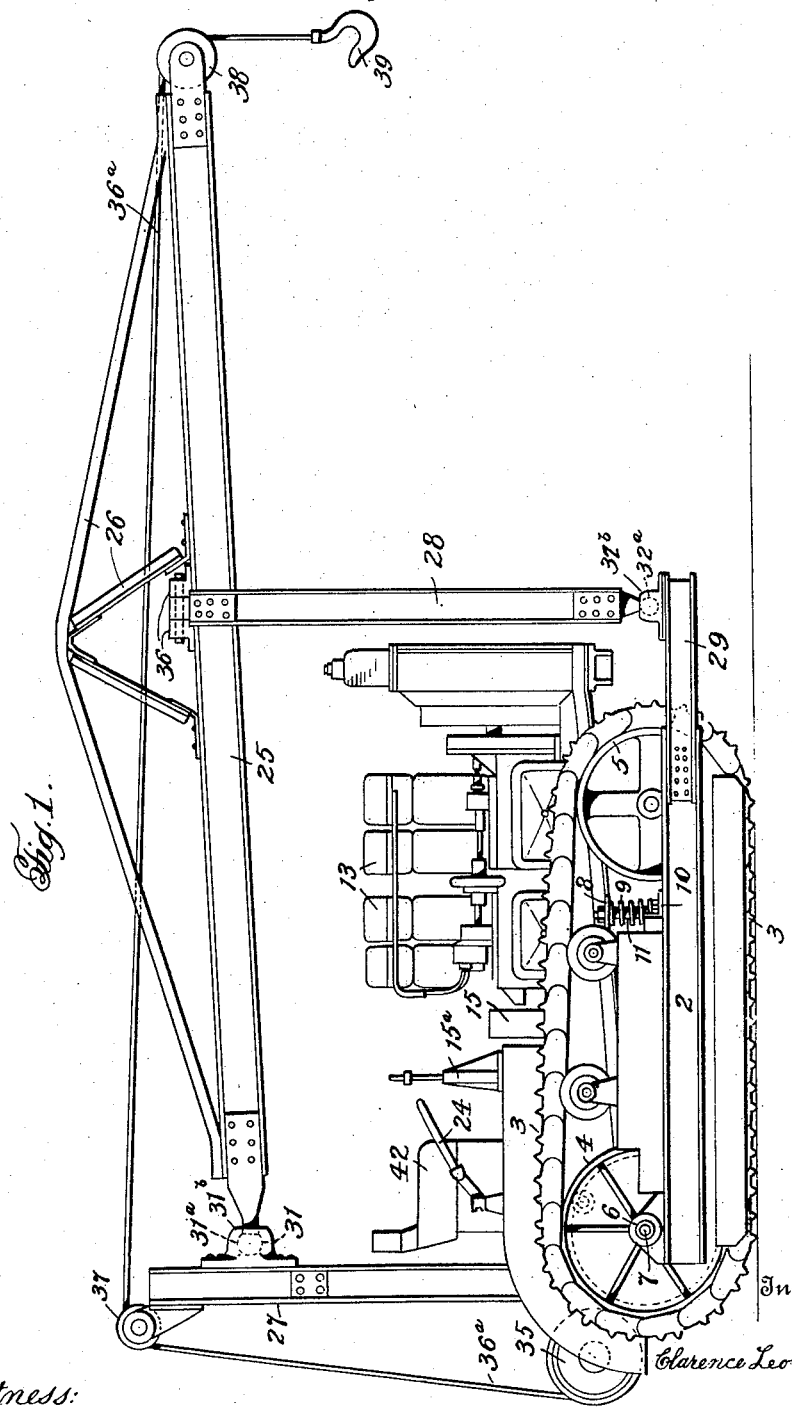

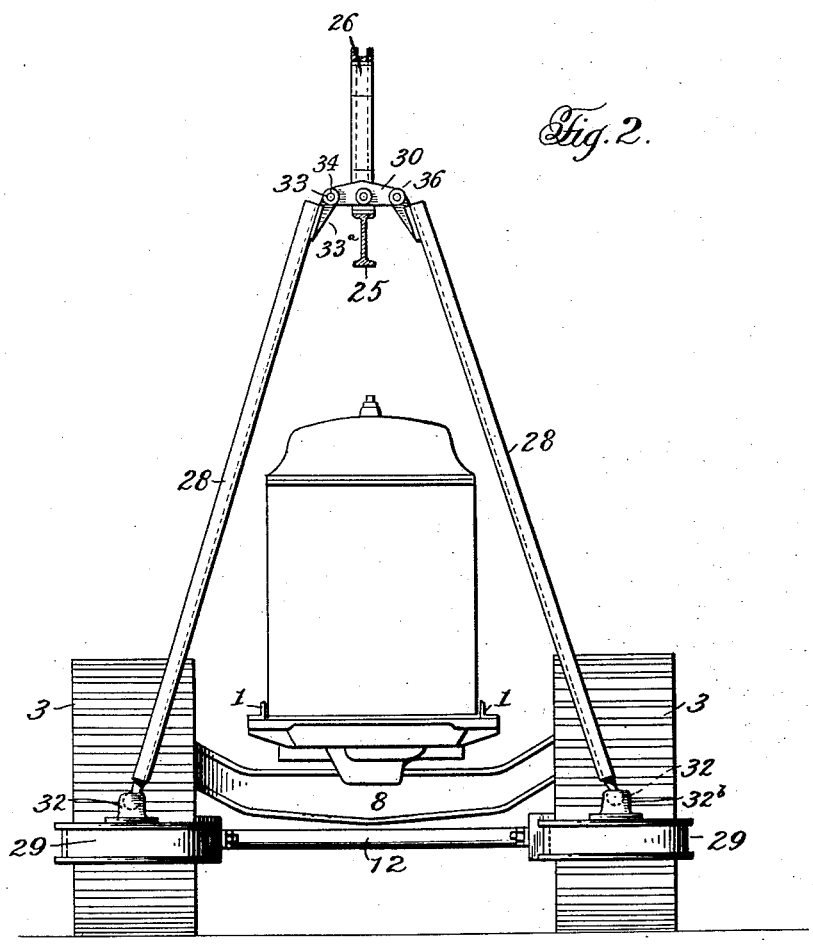

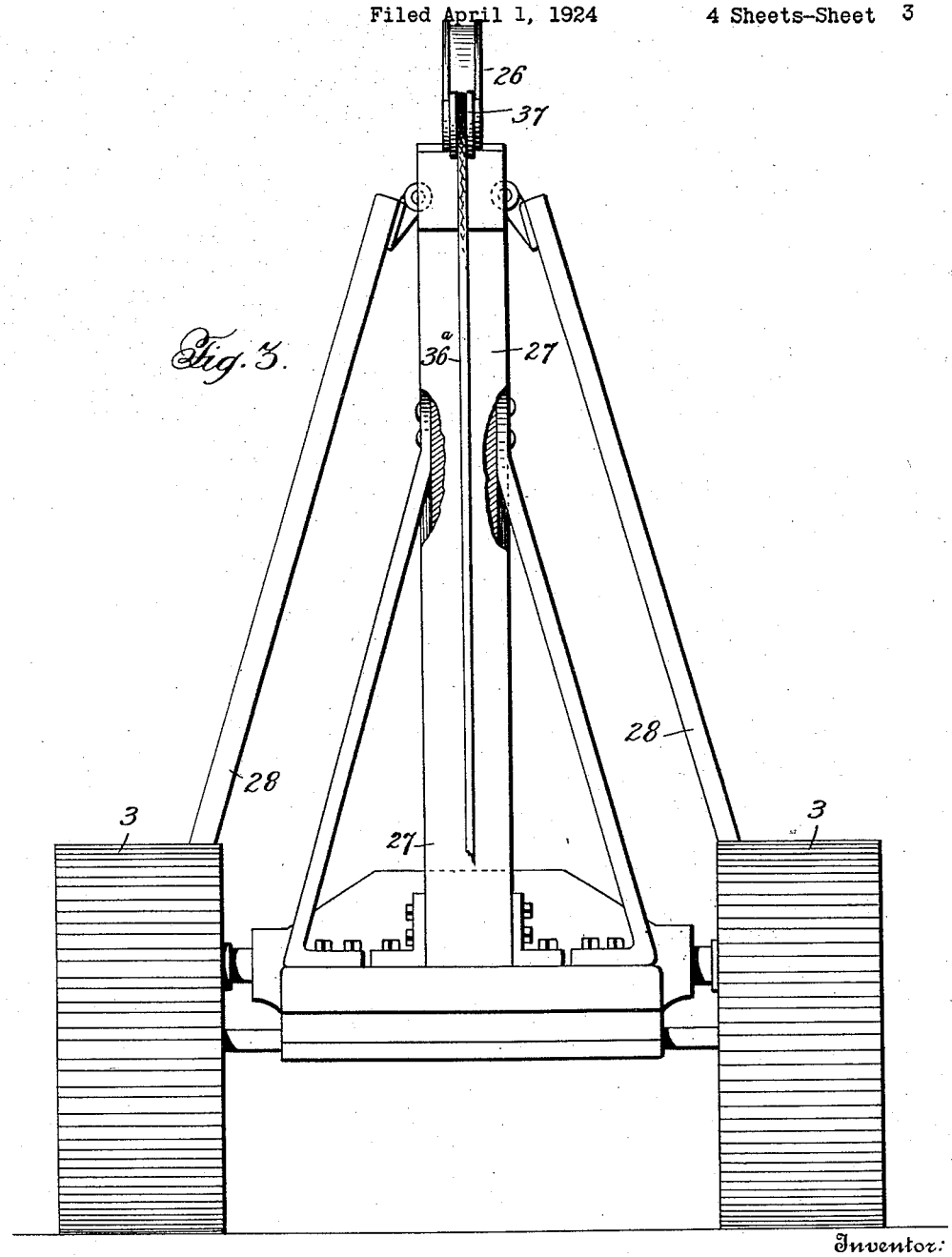

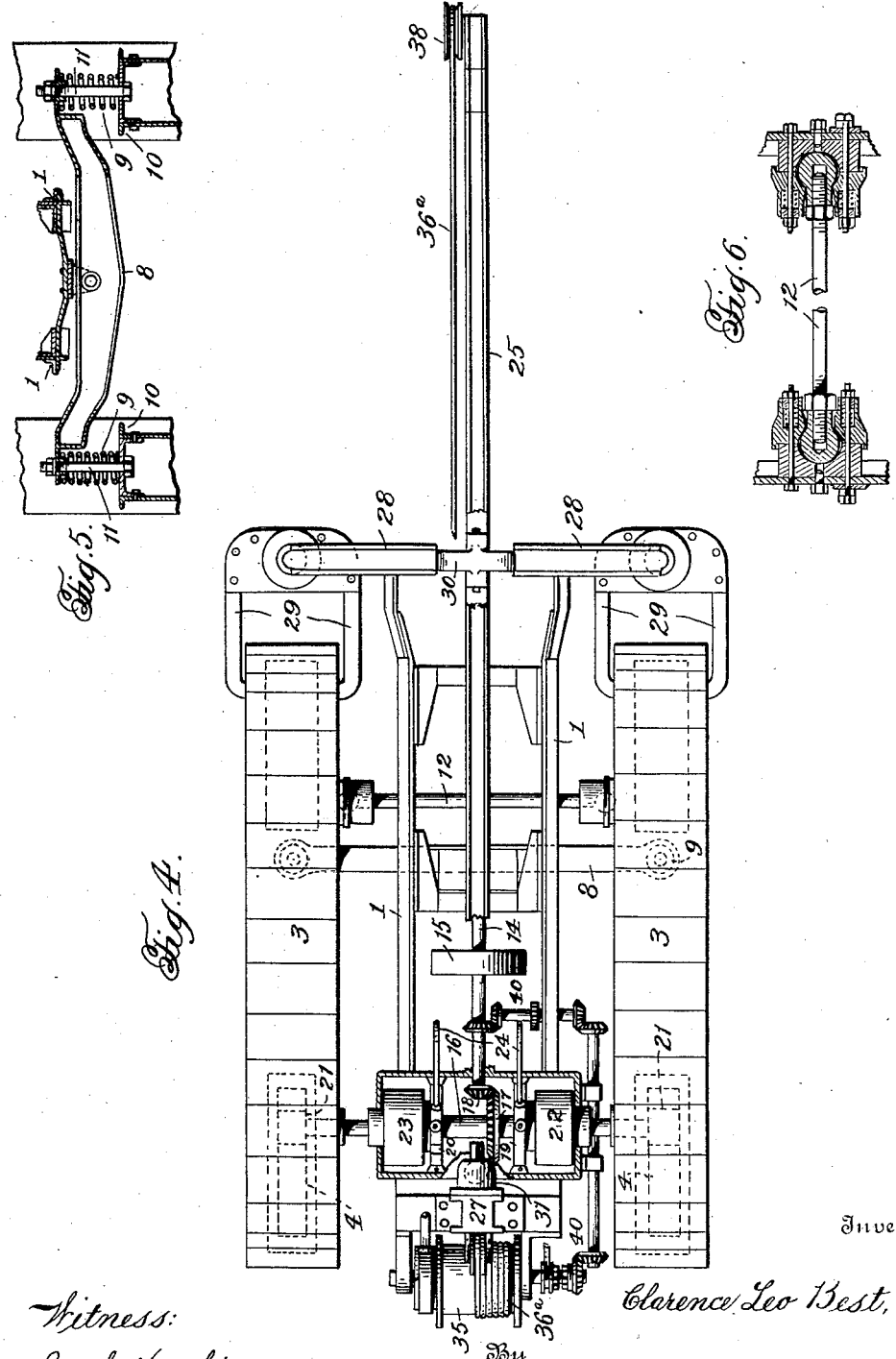

1,673,307

UNITED STATES PATENT OFFICE.

CLARENCE LEO BEST, OF SAN LEANDRO, CALIFORNIA, ASSIGNOR, BY MESNE ASSIGNMENTS, TO CATERPILLAR TRACTOR CO., OF SAN LEANDRO, CALIFORNIA, A CORPORATION OF CALIFORNIA.

TRACTOR HOIST.

Application filed April 1, 1924. Serial No. 703,480.

This invention relates to an improved tractor hoist particularly useful for bunching logs.

The object of the invention is to provide an improved tractor hoist of simple, compact, strong, durable construction adapted to operate in forests over uneven or soft, sandy, swampy and brush covered ground, and capable of being easily handled or manœuvred.

The invention comprehends a tractor hoist including a tractor having a main frame and a pair of tractor trucks supporting the main frame and each pivotally connected thereto for independent vertical oscillatory movement to automatically accommodate itself to varying ground contours, in combination with a hoisting boom or supporting beam mounted directly upon the tractor to extend in operative position longitudinally and centrally of the sides thereof.

Important novel characteristics of the invention reside in the special arrangement of the supporting beam or boom longitudinally and centrally of the tractor, and in the special mounting and supporting of the same upon the main frame and tractor trucks in this position, whereby the load is advantageously supported and distributed throughout the hoisting and carrying operations to facilitate the manœuvring of the tractor, and the log bunching operations, and whereby strains due to side slosh or swaying of the load are not transmitted to the main frame and power unit.

The invention, with other objects and advantages thereof, and the particular construction, combinations, and arrangement of parts comprising the same, will be understood from the following detail description, when considered in connection with the accompanying drawings forming part hereof and illustrating one embodiment of the invention.

In the drawings:

Figure 1 is a side elevation of a tractor hoist constructed in accordance with the present invention.

Fig. 2 is a front end elevation.

Fig. 3 is a rear end elevation.

Fig. 4 is a top plan view.

Fig. 5 is a detail view, on an enlarged scale, of the equalizer bar and its connection with the main frame and truck frames of the tractor.

Fig. 6 is a detail view of the strut connection between the truck frames.

While a specific embodiment of the invention is illustrated in the drawings, it will of course be understood that minor changes and variations in the particular construction shown, and the embodiment of the invention in other forms, as will appeal to those skilled in the art and falling within the scope of the appended claims, may be practiced without departing from the spirit of the invention.

Referring in detail to the particular construction illustrated in the drawings, 1 designates the main frame of the machine, and 2—2 are the tractor trucks. Each tractor truck comprises a truck frame consisting of spaced channels suitably secured together, an endless tread 3, a rear driving sprocket 4, and a front idler wheel 5. The tractor trucks are pivotally connected at their rear end portions to the rear end portion of the main frame 1 so that the other end portions of the truck frames are free to swing in a vertical arc independently of each other, said truck frames having journals 6 engaging an axle 7 suitably secured to the rear portion of the main frame 1, the driving sprockets 4 being journaled upon the said axle. The main frame 1 is supported at its forward part upon the forward portions of the tractor trucks 2—2 through the medium of an equalizer bar 8 and load supporting springs 9, said equalizer bar being pivotally connected centrally of its ends to the main frame 1, and the springs 9 being interposed between the ends of the equalizer bar and parts 10 of the truck frames. 11 designates vertical rods or stems extending centrally of the coiled springs 9 and passing through openings in the end portions of the equalizer bar and portions of the truck frames, said rods or stems having abutments or stops at their outer ends. Interposed between the forward end portions of the tractor trucks 2—2 is a strut 12 adapted to prevent the trucks from toeing together in front and to relieve the parts of strain while making short turns, suitable flexible connections being provided, as shown, between the ends of the strut 12 and the truck frames to accommodate for the vertical oscillation of the trucks. 13 designates the motor or power means mounted on the main frame 1, 14 is the engine shaft and 15 the clutch. Power is transmitted to the endless tracks 2—2 by a transverse drive shaft 16 having a beveled pinion 17 meshing with a pinion 18 on the motor shaft 14, and the driven shaft elements 19—20 extending from opposite ends of the drive shaft 16 and having pinions 21 at their outer ends meshing with internal gears on the driving sprockets 4 of the tractor trucks 2—2. 22—23 designate clutches for connecting the driven shaft elements 19—20 with the transverse drive shaft 16, providing for steering the machine by disengagement of and varying the speed of the endless tracks 2—2. 24 designates control levers for the clutches 22—23. The clutches 22—23 may be of any of the well known forms of friction clutch and are only indicated in a general way.

Referring now to the hoisting mechanism, 25 designates the supporting beam or boom supported to extend longitudinally and centrally of the tractor and forwardly of the front thereof, the beam or boom being shown formed of a channel iron member provided with a truss 26 at its upper side. The beam or boom 25 is supported at one end on the rear end of the main frame 1 by a mast 27 rigidly secured to the main frame centrally of the sides thereof, and suitably braced as shown, and at a point substantially centrally of its ends, the beam or boom 25 is supported at the front of the machine upon the tractor trucks 2—2 by a pair of struts 28, the tractor trucks 2—2 being provided at their front ends with frame portions 29 extending forwardly of the front end of the main frame 1 and motor 13, and said struts extending upwardly from said frame portions 29 at an inward inclination on either side of the beam 25, and being connected at their upper ends with opposite ends of a yoke or lever 30 pivotally connected centrally of its ends to the beam 25 to extend and rock in a plane transversely of the beam. The supporting beam or boom has a universal joint connection 31 with the mast 27, and each of the struts has a universal joint connection with one of the tractor truck frames, and a horizontal hinge connection 33 with the beam 25 through the pivoted yoke or lever 30, this construction serving to support the beam mainly upon the tractor trucks 2—2 entirely free of the main frame 1 and the power unit thereon while at the same time providing for up and down movements of the forward portions of the trucks, the pair of struts 28, which are of equal length, acting to maintain the supporting beam in a position substantially centrally of the sides of the machine, and the horizontal hinge connections 33 between the upper ends of the struts and the ends of the pivoted yoke or lever 30 permitting angular movement of the struts transversely of the beam but holding the struts against movement longitudinally of the beam.

The universal joint connections 31—32, which may be of any suitable form, are preferably, as shown, of the ball and socket type, comprising ball members 31$^a$, 32$^a$ on the beam 25 and the lower ends of the struts 28, engaging respectively socket members 31$^b$, 32$^b$ on the mast 27 and frame portions 29 of the trucks 2—2. The horizontal hinge connections 33 between the upper ends of the struts 28 and the yoke 30 comprise straps 33$^a$ on the struts engaging pintles 34 and held thereby between spaced hinge members 36 on opposite ends of the transverse yoke 30. 35 designates a hoisting drum or winch and 36$^a$ a hoisting cable connected with the drum, said cable 36$^a$ extending upwardly from the drum 35 over a pulley 37 on the mast 27, and thence along the beam 25 and out over a pulley 38 on the front end of the beam, the cable at its outer end being provided with any suitable form of grapple, shown in the drawings as a hook 39. 40 designates a drive connection leading from the shaft 14 to the hoisting drum 35, said connection being controlled through the medium of a clutch 15. 41 designates a hand brake for the hoisting drum.

The control levers 24 for the clutches 22, and the control lever 15$^a$ for the engine clutch 15 are arranged as shown adjacent the operator's seat 42 mounted on the rear portion of the main frame 1.

It will be noted that by the special construction and arrangement of parts hereinbefore described, the load is advantageously distributed, the load supporting beam being mainly supported upon the tractor trucks entirely free from the main frame, and strains due to side slosh of the load are not transmitted to the main frame and power unit, the structure being of a strong durable nature capable of efficiently operating over rough or soft swampy land. The supporting of the load always substantially centrally of the machine at the front thereof also facilitates the manœuvring of the machine and in performing the lifting and conveying of the logs in the bunching operations, the hoisting tackle always being within easy view from the operator's seat.

Subject matter shown but not claimed in the present application is claimed in my application Serial No. 410,419, filed September 15, 1920.

What I claim is:

1. In a tractor hoist, the combination of a main frame, a pair of tractor trucks to support the main frame at opposite sides thereof, each tractor truck including a truck frame and an endless track thereon, the truck frames being pivotally connected at their rear end portions with the main frame to provide for independent vertical movement of the forward portions of the truck frames, power means mounted on the main frame, and hoisting mechanism including a mast mounted on the main frame rearwardly of the front end thereof, a boom having a universal joint connection at one end with said mast and extending forwardly of the front end portion of the main frame, a pair of struts supporting the boom from the tractor trucks forwardly of said mast, each of said struts being pivotally connected at opposite ends respectively with one of the truck frames and said boom.

2. In a tractor hoist, the combination of a main frame, a pair of tractor trucks to support the main frame arranged at opposite sides thereof, each tractor truck including a truck frame and an endless track thereon, the truck frames being pivotally connected at their rear end portions with the main frame to provide for independent vertical movement of the forward portions of the truck frames, power means mounted on the main frame, and hoisting means including a mast mounted on the main frame rearwardly of the front end thereof, a boom having a universal joint connection at one end with said mast and extending forwardly of the front end portion of the main frame, and a pair of struts supporting the boom from the tractor trucks forwardly of said mast, each of said struts having a universal joint connection at one end with the free end portion of one of the tractor trucks, and a horizontal hinge connection at its other end with said boom.

3. In a tractor hoist, the combination of a main frame, a pair of tractor trucks to support the main frame arranged at opposite sides thereof, each tractor truck including a truck frame and an endless track thereon, the truck frames being pivotally connected at their rear end portions with the main frame at the rear portion thereof to provide for independent vertical movement of the forward portions of the truck frames, power means mounted on the main frame, and hoisting mechanism including a mast mounted on the main frame at the rear portion and centrally of the sides thereof, a boom having a universal joint connection at one end with said mast and extending longitudinally and centrally of the main frame and forwardly of the front end portion thereof, a pair of struts supporting the boom from the tractor trucks forwardly of said mast, each of said struts having a universal joint connection at its lower end with the free end portion of one of the tractor trucks, and having a horizontal hinged connection at its upper end with said boom, a hoisting drum on the main frame, and a hoisting cable associated with the said boom and connected with the drum.

4. In a tractor truck, the combination of a main frame, a pair of tractor trucks to support the main frame arranged at opposite sides thereof, each tractor truck including a truck frame and an endless track thereon, the truck frames being pivotally connected at their rear end portions with the rear end portion of the main frame to provide for independent vertical movement of the forward portions of the truck frames, power means mounted on the main frame, and hoisting means including a mast mounted on the main frame at the rear and centrally of the sides thereof, a boom having a universal joint connection at one end with said mast and extending longitudinally and centrally of the main frame and forwardly of the front end thereof, a pair of struts supporting the boom from the tractor trucks forwardly of said mast, each of said struts having pivotal connections at opposite ends respectively with the forward end portion of one of the tractor trucks and the boom, a hoisting drum on the main frame, and a hoisting cable associated with said boom and connected with the drum.

5. In a tractor hoist, the combination of a main frame, a pair of tractor trucks to support the main frame arranged at opposite sides thereof, each tractor truck including a truck frame and an endless track thereon, the truck frames being pivotally connected at their rear end portions with the main frame to provide for independent vertical movement of the forward portions of the truck frames, power means mounted on the main frame, and hoisting means including a mast mounted on the main frame at the rear and centrally of the sides thereof, a boom having a universal joint connection at one end with said mast and extending longitudinally and centrally of the main frame and forwardly of the front end thereof, a pair of struts supporting the boom from the tractor trucks forwardly of said mast, said boom having a transversely extending yoke portion, each of said struts having a universal joint connection at its lower end with the free end portion of one of the tractor trucks, and having a horizontal hinge connection at its upper end with one end of said yoke, a hoisting drum on the main frame, and a hoisting cable associated with said boom and connected with the drum.

6. In a tractor hoist, the combination of a main frame, a pair of tractor trucks to support the main frame arranged at opposite sides thereof, each tractor truck including a truck frame and an endless track thereon, the truck frames being pivotally connected at opposite portions thereof with the main frame to provide for independent vertical oscillatory movement of the truck frames, power means on the main frame, and hoisting mechanism including a mast mounted on the main frame, a boom having a universal joint connection with said mast and extending forwardly of one end of the main frame, and a pair of struts supporting said boom from the tractor trucks at one side of said universal joint connection of the boom with the mast, each of said struts being pivotally connected at opposite ends respectively with one of the tractor trucks and said boom.

7. In a tractor hoist, the combination of a main frame, a pair of tractor trucks to support the main frame arranged at opposite sides thereof, each tractor truck including a truck frame and an endless track thereon, the truck frames being pivotally connected at opposite portions thereof with the main frame to provide for independent vertical oscillatory movement of the truck frames, power means on the main frame, and hoisting mechanism including a mast mounted on the main frame, a boom having a universal joint connection with said mast and projecting forwardly of one end of the main frame, and a pair of struts supporting said boom from the tractor trucks at one side of the universal joint connection of the boom with the mast, each of said struts having a universal joint connection at its lower end with one of the tractor trucks and having a horizontal hinge connection at its upper end with said boom.

8. In a tractor hoist, the combination of a main frame, a pair of tractor trucks to support the main frame arranged at opposite sides thereof, each tractor truck including a truck frame and an endless track thereon, the truck frames being pivotally connected at their rear end portions with the main frame to provide for independent vertical movement of the forward portions of the truck frames, power means mounted on the main frame, and hoisting means including a mast mounted on the main frame at the rear and centrally of the sides thereof, a boom having a universal joint connection at one end with said mast and extending longitudinally and centrally of the main frame and forwardly of the front end thereof, a pair of struts supporting the boom from the tractor trucks forwardly of said mast, a transversely extending yoke member pivotally connected centrally of its ends to said boom for rocking movement transversely relatively thereto, each of said struts having a universal joint connection at its lower end with the free end portion of one of the tractor trucks, and having a horizontal hinged connection at its upper end with one end of said yoke, a hoisting drum on the main frame, and a hoisting cable associated with said boom and connected with the drum.

In testimony whereof I hereunto affix my signature.

CLARENCE LEO BEST.